J. & H. H. HARTMAN.
GAMBREL.
APPLICATION FILED DEC. 30, 1911.

1,023,148.

Patented Apr. 16, 1912.

Witnesses
Benj. Pinckel
Donald W. Kling.

Inventors.
John Hartman and
Henry H. Hartman.
by their Attorneys

COLUMBIA PLANOGRAPH CO., WASHINGTON, D. C.

UNITED STATES PATENT OFFICE.

JOHN HARTMAN AND HENRY H. HARTMAN, OF MORRAL, OHIO.

GAMBREL.

1,023,148.  Specification of Letters Patent.  Patented Apr. 16, 1912.

Application filed December 30, 1911. Serial No. 668,798.

*To all whom it may concern:*

Be it known that we, JOHN HARTMAN and HENRY H. HARTMAN, citizens of the United States, residing at Morral, in the county of Marion and State of Ohio, have invented a certain new and useful Improvement in Gambrels, of which the following is a specification.

This invention relating more especially to means for the use of butchers in suspending carcasses has for its object to provide a device of simple, strong, compact and easily operated construction.

The invention is embodied in the example herein shown, described and particularly pointed out in the claims.

Figure 1:
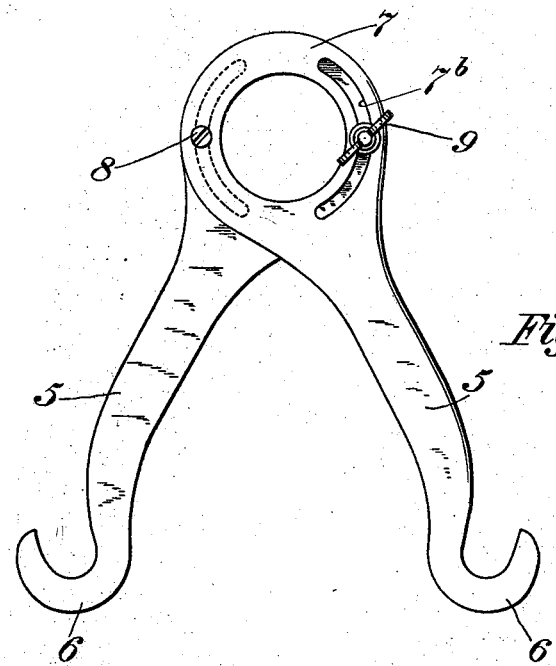
Figure 2:
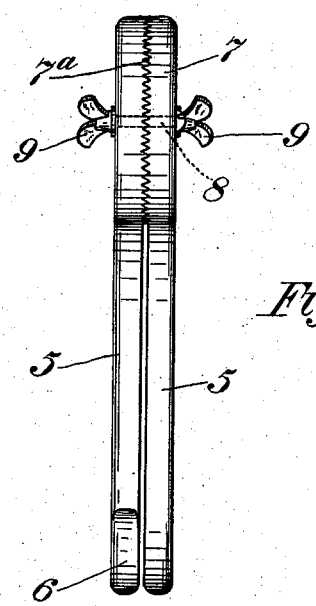

In the accompanying drawing forming part hereof—Figure 1 is a view in side elevation of the said embodiment of our invention. Fig. 2 is an edge view of the same.

The device comprises mainly a pair of arm members which are substantially identical with each other. Each of these members consists of an arm portion 5 having a hook 6 at its lower end and a ring or circular eye 7 at its upper end. Each ring or circular eye 7 is radially toothed or serrated as seen at 7$^a$ and each is also made with a slot 7$^b$ on an arc concentric with the center of the ring. The slot in each member begins from a point near the longitudinal center line of the arm and extends upward about a third of the way around the circle.

The serrations are made on the corresponding faces of the ring so that when the serrated faces are placed or matched together the hooks at the lower ends of the arms extend in opposite directions. Each ring is provided with a fixed threaded bolt 8 that extends through the slot of the companion member. Applied to the threaded ends of the bolts are threaded winged nuts 9 so that the rings can be clamped together with the serrations engaged with each other to lock the arms from movement, or the nuts turned to permit separation of the teeth and an adjustment of the members to a different or necessary angle to engage the parts of the carcass to be suspended.

The device is hung by means of the ring at the top, the same being placed over a suitable hook, or a suspending rope can be passed through the ring and tied to secure it to the gambrel.

What we claim is:

1. A gambrel hook including in combination, a pair of hook arms, having lapping open rings at their upper ends, said rings being adjustable on each other and means for locking said rings in adjusted position.

2. A gambrel hook including in combination, a pair of hook arms having open rings provided with serrated faces lapping upon each other, said rings each provided with a slot, a threaded bolt on each ring passing through the slot of the other, and clamping nuts on said bolts adapted to hold said rings engaged with each other.

3. A gambrel hook including, in combination, a pair of hook arms having open rings provided with faces constructed to interlock with each other, said rings each provided with an arc-shaped slot concentric with the center of the ring, a bolt on each ring passing through the slot of the other and clamping devices connected with said bolts adapted to hold said rings engaged with each other.

JOHN HARTMAN.
HENRY H. HARTMAN.

Witnesses:
S. E. MORRAL,
C. J. SCHULTZ.

Copies of this patent may be obtained for five cents each, by addressing the "Commissioner of Patents, Washington, D. C."